United States Patent [19]

Akashi et al.

[11] Patent Number: 4,716,282

[45] Date of Patent: Dec. 29, 1987

[54] FOCUS STATE DETECTION METHOD AND APPARATUS WITH SELECTIVE STATISTICAL PROCESSING

[75] Inventors: Akira Akashi, Yokohama; Hiroshi Ohmura, Wako; Akira Ishizaki, Yokohama; Keiji Ohtaka, Tokyo; Yasuo Suda, Yokohama, all of Japan

[73] Assignee: Canon Kabushiki Kaisha, Tokyo, Japan

[21] Appl. No.: 764,002

[22] Filed: Aug. 9, 1985

[30] Foreign Application Priority Data

Aug. 17, 1984 [JP] Japan ............... 59-171038

[51] Int. Cl.$^4$ ............... G01N 1/20
[52] U.S. Cl. ............... 250/201; 250/204; 354/406
[58] Field of Search ............... 250/201, 204, 208, 209, 250/578; 354/406, 407, 408

[56] References Cited

U.S. PATENT DOCUMENTS 4,523,829  6/1985  Eguchi et al. ............... 354/406
4,584,656  4/1986  Sakai et al. ............... 250/204

Primary Examiner—David C. Nelms
Attorney, Agent, or Firm—Fitzpatrick, Cella, Harper & Scinto

[57] ABSTRACT

A method and apparatus for detecting the focus state of an object image pattern in accordance with a plurality of photo-electrically converted output signals, including a first mode in which the plurality of photo-electrically converted output signals are sampled at different times and statistically processed for each output, wherein the focus state is detected in accordance with the statistically processed outputs, and a second mode for detecting the focus state without the statistical processing.

13 Claims, 7 Drawing Figures

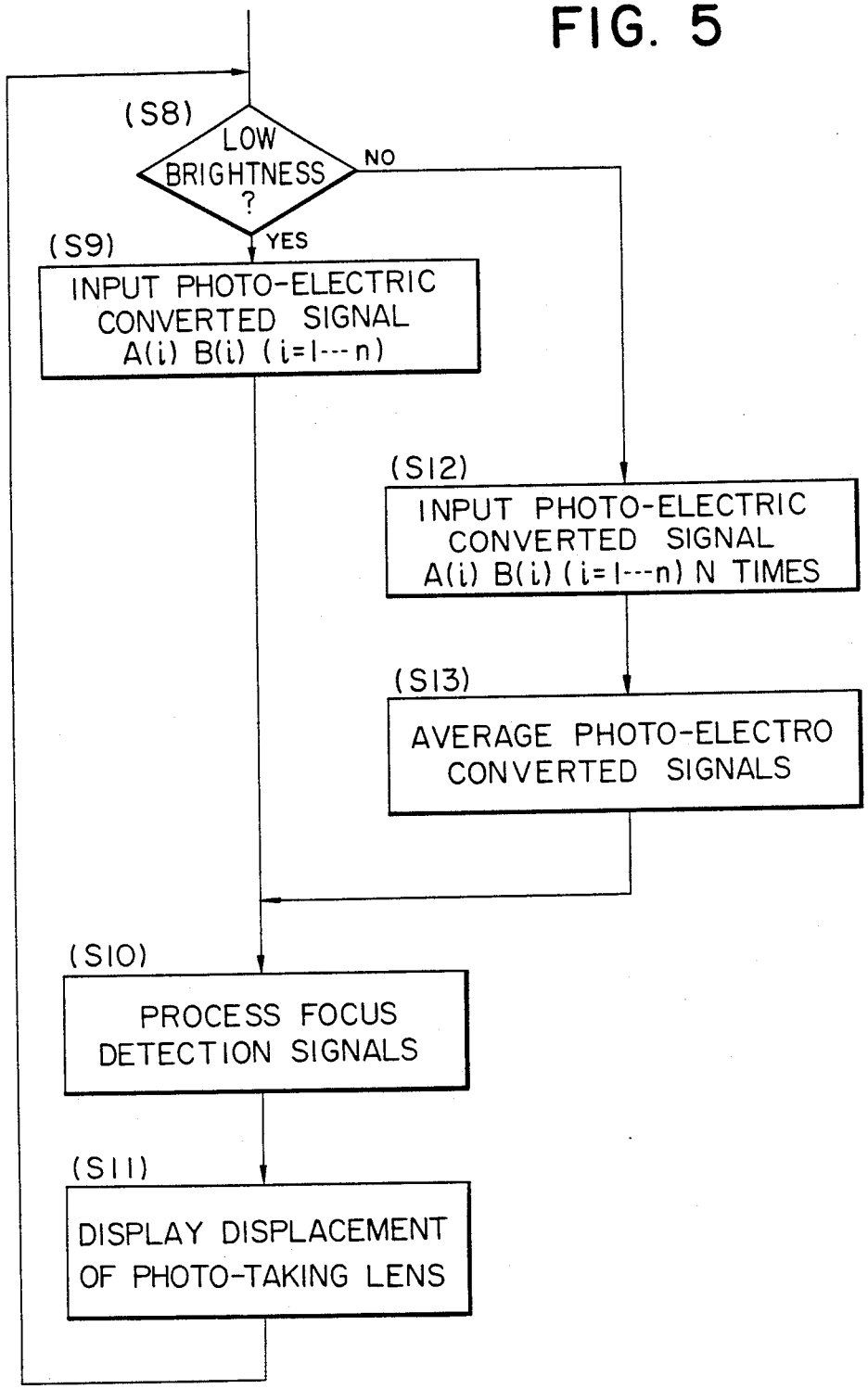

FOCUS STATE DETECTION METHOD AND APPARATUS WITH SELECTIVE STATISTICAL PROCESSING

BACKGROUND OF THE INVENTION

1. Field of the Invention

The present invention relates to a focus state detection apparatus, and more particularly to a focus state detection apparatus suitable for a camera.

2. Description of the Prior Art

Various focus state detection apparatus have been proposed. They are classified into one of a defocus system and a deviation system. In the former system, when an image of an object is projected onto a CCD or BBD sensor, a sharpness is maximum in an in-focus state and the image is not sharp in an out-of-focus state. A difference therebetween is electrically detected to determine the in-focus state. In the latter system, a relative deviation of the object image is detected by a pair of photoelectric elements, as disclosed in Japanese Patent Application Laid Open Nos. 118,019/1970 and 155,331/1970 and U.S. Pat. No. 4,185,191.

In those methods, however, when the object image is converted to the electrical signal by the sensor, a noise component which is periodically generated by the sensor or a processing circuit is introduced into the photoelectrically converted signal. As a result, a resulting focus detection signal includes an error and hence a high precision focus detection is not attained. The above problem may be somewhat resolved by preventing the introduction of the noise into the sensor or the signal processing circuit but it is difficult to completely prevent the introduction of the noise and the circuit is complex of an antinoise performance is to be enhanced. On the other hand, the noise component can be reduced by an appropriate signal processing algorithm but it is not a complete solution to the problem.

SUMMARY OF THE INVENTION

It is an object of the present invention to prevent reduction of a focus state detection precision by a noise.

It is another object of the present invention to relieve an influence to a photoelectrically converted signal by a noise caused by a sensor device or a signal processing circuit.

It is another object of the present invention to start focusing in a short signal processing time when the focusing state of an object is greatly deviated from an in-focus state, when an object field is dark or when the object has a low contrast and hence a high precision focus state detection is not expected or a long time is required for signal detection.

It is another object of the present invention to convert an object image to an electrical signal by a photoelectric sensor, to statistically process a plurality of signals to produce a focus state detection signal and to eliminate an unstable noise component during the statistical processing.

It is another object of the present invention to select a mode in which a focus is detected without statistical processing and a mode in which the focus is detected after the statistical processing, in accordance with at least one of the focus detection result and a brilliance level of an object.

Other objects of the present invention will be apparent from the following description of preferred embodiments of the present invention.

BRIEF DESCRIPTION OF THE DRAWINGS

FIG. 5 is an operation flow chart in another mode.

DETAILED DESCRIPTION OF THE PREFERRED EMBODIMENTS

Figure 1:
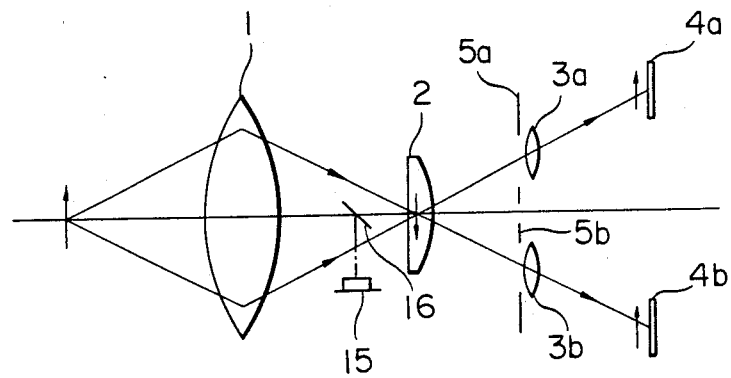
FIG. 1 shows an arrangement of an optical system used for focus state detection processing in accordance with the present invention.

FIG. 1 shows an arrangement of an optical system of a deviation type focus state detection apparatus to which the present invention is applied. Numeral 1 denotes an imaging lens, numeral 2 denotes a field lens, numerals 3a and 3b denote secondary focusing lenses, and numerals 4a and 4b denote photo-sensor arrays such as CCD sensor arrays. The photo-sensor arrays are shown separately although they may be two regions arranged in one line. The field lens 2 is arranged in a focus plane of the imaging lens 1. A primary image formed by the imaging lens 1 is focused onto the photo-sensor arrays 4a and 4b through the secondary focusing lenses 3a and 3b. Numerals 5a and 5b denote stops arranged near the lenses 3a and 3b, respectively. In an actual camera, the optical system is isolated from a film plane focusing optical system by a mirror although it is not shown because it is not relevent to the present invention.

The field lens 2 focuses an exit pupil of the imaging lens 1 onto pupil planes of the two secondary focusing lenses 3a and 3b. As a result, light fluxes impinged onto the secondary focusing lenses 3a and 3b are emitted from non-overlapping areas of the same size corresponding to the secondary focusing lenses 3a and 3b on the exit pupil plane of the imaging lens 1. Accordingly, when a spatial image formed near the field lens 2 is refocused onto the sensor arrays 4a and 4b by the secondary imaging lenses 3a and 3b, the positions of the refocused images change in accordance with a deviation of the position of the spatial image from a predetermined portion in an optical axis.

Figure 2A:
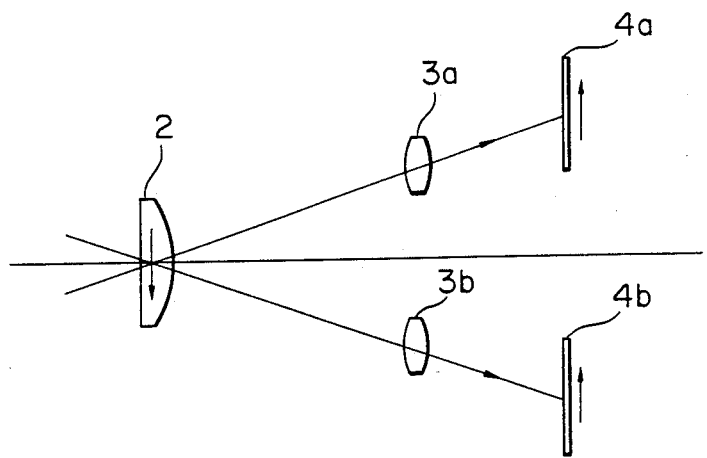
FIGS. 2A, 2B and 2C illustrate operations of the optical system of FIG. 1.
Figure 2B:
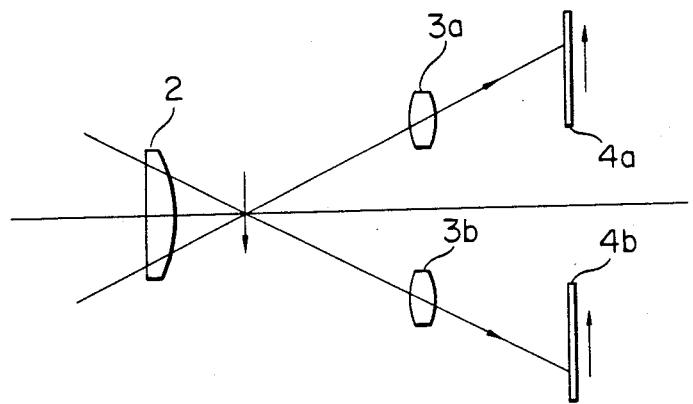
Figure 2C:
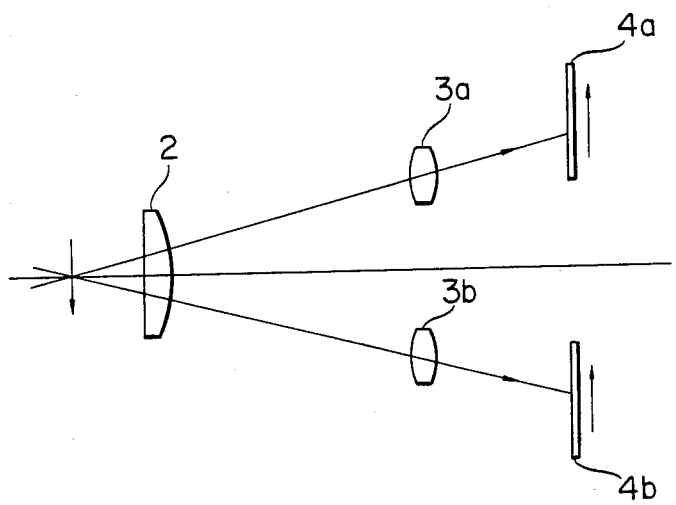

FIG. 2 illustrates the above phenomenon. FIG. 2A shows an in-focus state, FIG. 2B shows a fore-focus state and FIG. 2C shows a rear-focus state. The images formed on the sensor arrays 4a and 4b move in opposite direction on the sensor arrays in FIGS. 2B and 2C with respect to FIG. 2A. An image light intensity distribution is photo-electrically converted by the sensor arrays 4a and 4b and the output signals are processed by a known focus detection signal processing method such as that disclosed in Japanese Patent Application Laid Open Nos. 142306/1983 or 217468/1982, and a relative deviation of the two images is detected to determine an in-focus state.

Figure 3:
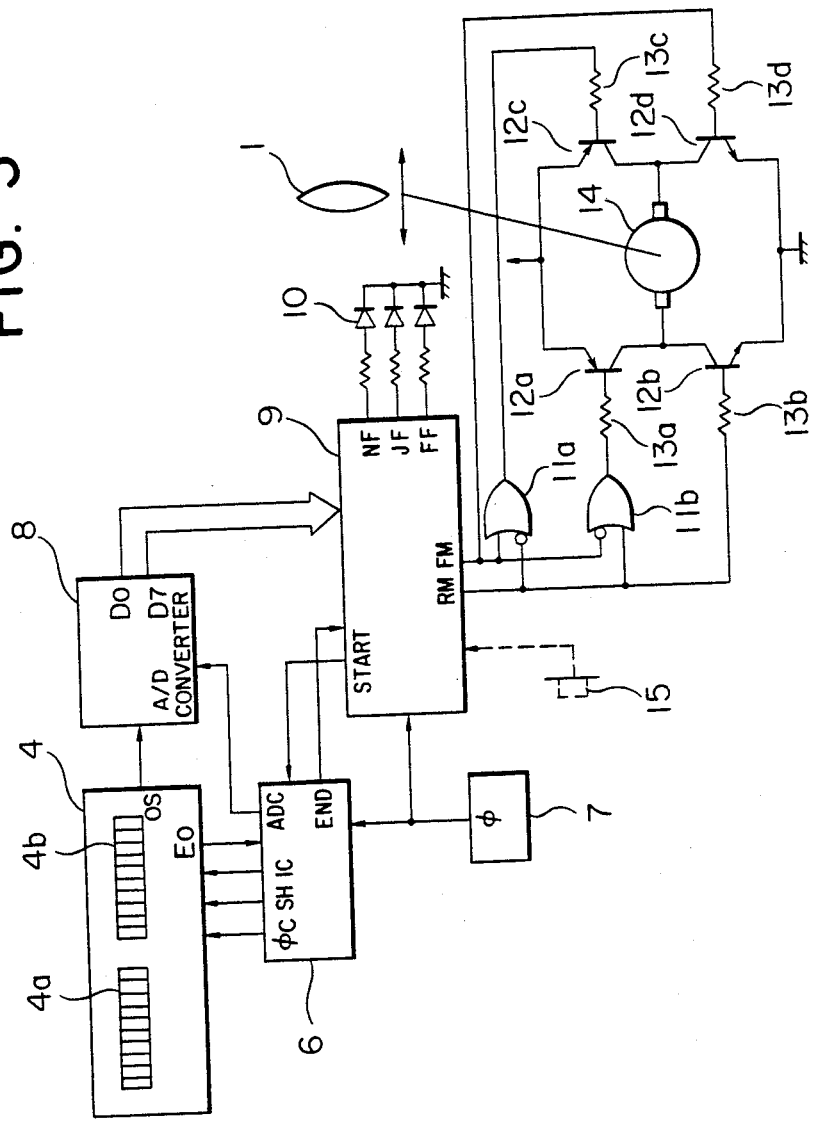
FIG. 3 is a circuit diagram of a focus detection apparatus of the present invention.

FIG. 3 shows a signal processing circuit of the focus detection apparatus of the present invention which uses the optical system shown in FIG. 2. Numeral 9 denotes an image signal processing circuit which may be a one-chip micro-computer having a CPU, a memory and input/output ports. A sensor 4 may be a CCD sensor which has the sensor arrays 4a and 4b of FIG. 1. Two images by light fluxes which pass through different fluxes which pass through different areas of the imaging lens are formed on the sensor arrays 4a and 4b. Numeral 6 denotes a CCD sensor driver which is connected to the CCD sensor 4 and stores and transfers charges of the optical image by a clock signal φc, a shift signal SH and a start of store signal IC which are provided as control signals from the driver 6.

When the image signal processing circuit 9 applies a start signal to the CCD driver 6, the CCD driver 6 sends the start of store signal CI and a clock signal φ generated by the clock generator 7 to the sensor 4. The sensor starts to store the two image from this time and when the store reaches a predetermined level, the sensor 4 sends an end of store signal EO to the CCD driver 6. The CCD driver 6 sends the charge transfer signal SH to the sensor 4 to transfer the stored charge from the sensor 4 to the CCD. It also sends a process signal END to the image signal processing circuit 9. Then, in synchronism with the clock φ from the CCD driver, the sensor 4 time-serially sends the analog signals OS of the two images to an AD converter 8, which converts them to 8-bit digital signals in synchronism with a conversion signal ADC from the CCD driver 6. The image signal processing circuit 9 receives the digital time-serial signals D0-D7.

Figure 4:
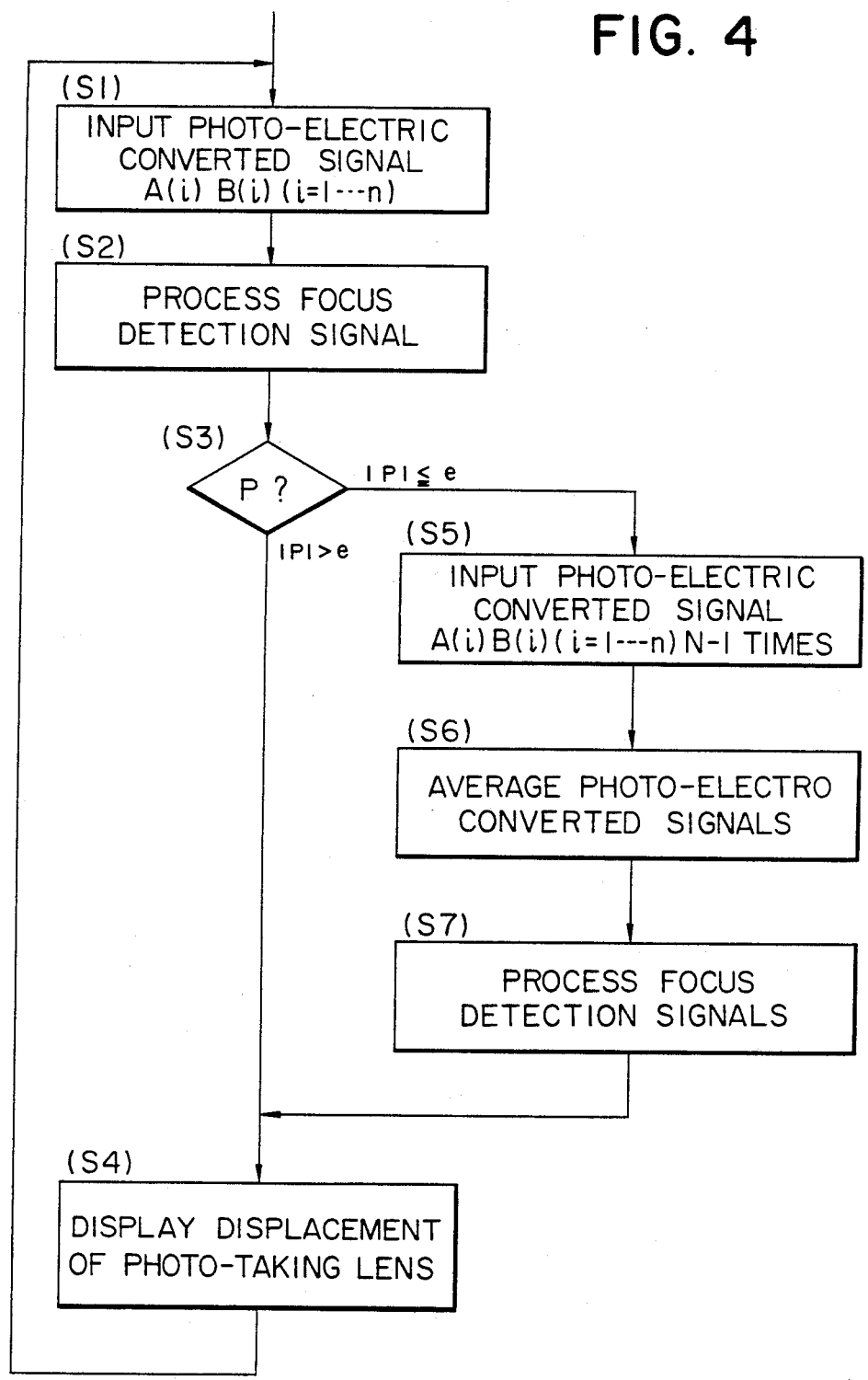
FIG. 4 is an operation flow chart in one signal processing mode of the apparatus of FIG. 3.

The image signal processing circuit receives the image signals one or N times in accordance with a flow shown in FIG. 4. If it receives the image signals N times, it time-averages the image signal for each pixel as statistical processing. The known focus detection signal processing is carried out based on the signals of the two images to detect a current focusing state, and if an out-of-focus state is detected, a motor 14 is driven by a signal from a terminal FM or RM of the image signal processing circuit 9 depending on the fore-focus or rear-focus state so that the imaging lens 1 is brought to an in-focus position.

The output ports RM and FM of the image signal processing circuit 9 drive the motor 14 to displace the imaging lens. In the in-focus state, the ports RM and FM are high, in the fore-focus state, the port RM is high and the port FM is low, and in the rear-focus state, the port RM is low and the port FM is high. Since the ports RM and FM are connected to a motor drive circuit which comprises gates 11a and 11b, transistors 12a-12d and resistors 13a-13d, the motor 14 is electrically shorted in the in-focus state, energized from right to left in the fore-focus state and energized from left to right in the rear-focus state to bring the imaging lens to the in-focus position.

Output ports NF, JF and FF are connected to displays 10 such as LED's to display the fore-focus, in-focus and rear-focus states, respectively. Excepting the image signal processing circuit, known circuits may be used and the explanation thereof is omitted.

Referring to FIG. 4, a flow of signal processing by the image signal processing circuit 9 is explained. (S1) . . . The photo-electrically converted signals $A_0(i)$ and $B_0(i)$ (i=1, 2, . . . , n) of the two images formed by the pupil split of the imaging lens are stored by the signal IC and read from the sensor 4 by the signal SH and supplied to the image signal processing circuit through the AD converter 8.

(S2) . . . The image signals are processed for focus detection signal processing in accordance with a predetermined algorithm in the image signal processing circuit 9.

(S3) . . . A defocus amount P of the imaging lens derived in (S2) is compared with a threshold value "e".

(S4) . . . If $|P|>e$, output signals are produced at the terminals RM, FM, NF, SF and FF in accordance with P to displace the imaging lens and display the status.

(S5) . . . If $|P| \leq e$, that is, if it is near the in-focus state, the (N-1) sets of image signals $A_1(i)$, $A_2(i)$, . . . $A_{N-1}(i)$, $B_1(i)$, $B_2(i)$ . . . $B_{N-1}(i)$ are repeatedly stored in and read from the sensor 4 is order to reduce the noise components in the image signals and to enhance the precision.

(S6) . . . One set of image signals in (S1) and (N-1) sets of image signals in (S5) are time-averaged for each pixel.

$$1/N\ [A_0(i)+A_1(i)+A_2(i)+ \ldots A_{N-1}(i)] = Ci$$

$$1/N\ [B_0(i)+B_1(i)+B_2(i)+ \ldots B_{N-1}(i)] = Di$$

$(i=1, 2, \ldots n)$ (S7) . . . The time-averaged image signals derived in (S6) are processed for focus detection and a resulting defocus amount P is used to displace the imaging lens and display the status.

The above flow can be carried out by a microcomputer program set in the image signal processing circuit 9.

In the present embodiment, the focus is detected is the step S2 and if the defocus amount in large in the step S3, the imaging lens is displaced. If the defocus amount is within the predetermined value, that is, if it is near the in-focus state in the step S5, the image signals are read (N-1) times for each pixel in the step S6 and integrated in the sensor and N outputs are stored for each pixel and they are statistically processed (averaged) to reduce the noise components. In the time-averaging process, the variations cancel each other and are reduced as a whole.

FIG. 5 shows another embodiment of the present invention. In the present embodiment, N sets of signals are time-averaged when a brightness of the object is in a predetermined range. If the brightness is lower, only one set of image signals are processed for focus detection in order to prevent operation time from being prolonged by the N times of storage. That is, in the low brightness, the operability rather than the precision is given a higher priority.

The flow of FIG. 5 is explained below.

(S8) . . . The brightness of the object is detected by a photo-cell (15 in FIG. 1). Numeral 16 in FIG. 1 denotes a beam splitter which directs a portion of the object image light to the photo-cell 15.

(S9) . . . If the brightness is low, the sensor 4 sends the photo-electrically converted image signals only one time.

(S10) . . . The photo-electrically converted image signals are processed for focus detection by the predetermined algorithm.

(S11) . . . Signals are produced at the terminals RM and FM in accordance with the focus detection signal to displace the imaging lens 1 and display the status or the display 10 such as LED.

(S12), (S13) . . . If the brightness of the object is not low, N sets of image signals are time-averaged for each pixel (for each photo-electrically converted output from the CCD sensor) in the same manner as that in the step S5, and the signals are processed for focus detection.

In the embodiment of FIG. 5, when the object view field is dark, less weight is put on the in-focus precision and more weight is put on the operability because a long storage time of the CCD sensor is required and a noise is readily introduced, and when the object view field is bright, the N sets of image signals are time-averaged to enhance the precision of the in-focus state detection.

In the above embodiments, the image signals are time-averaged to eliminate the noise. Alternatively, the image-signals may be detected as a geometrical mean. The steps S1–S3 of FIG. 4 and the step S8 of FIG. 5 may be used in the alternative.

In accordance with the present embodiment, the undesired noise component can be eliminated only by the predetermined statistical processing and the precision for in-focus state detection is enhanced. Since the statistical processing is selectively effected only when it is desired, the operability is improved.

What we claim is:

1. A focus state detection method comprising:
    a first step of photoelectrically detecting an image pattern of an object to produce a detection signal;
    a second step of sampling the detection signal a plurality of times, statistically processing the detection signals and detecting focus state in accordance with a result of the statistical processing;
    a third step of detecting focus state in accordance with the detection signal without the statistical processing; and
    a fourth step of selecting one of said second step and said third step.

2. A focus state detection method according to claim 1, wherein, in said fourth step, said second step or said third step is selected in accordance with a defocus amount.

3. A focus state detection method according to claim 1, wherein the brightness of an object field of the object is detected, and wherein said second step or said third step is selected in accordance with the detected brightness of the object field.

4. A focus state detection method according to claim 1, wherein the statistical processing in said second step includes time-averaging of the detection signals.

5. A focus state detection apparatus comprising:
    first means for photoelectrically detecting an image pattern of an object to produce a detection signal;
    second means for sampling the detection signal a plurality of times, statistically processing the detection signals and detecting focus state in accordance with a result of the statistical processing;
    third means for detecting focus state in accordance with the detection signal without the statistical processing; and
    fourth means for selecting one of said second means and said third means.

6. A focus state detection apparatus according to claim 5, wherein said fourth means selects said second means or said third means in accordance with a defocus amount.

7. A focus state detection apparatus according to claim 5, wherein the brightness of an object field of the object is detected, and wherein said fourth means selects said second means or said third means in accordance with the detected brightness of the object field.

8. A focus state detection apparatus according to claim 5, wherein the statistical processing by said second means includes time-averaging of the detection signals.

9. A focus state detection apparatus according to claim 5, wherein said first means includes a photo-sensor array.

10. A focus state detection apparatus comprising:
    first and second pattern detection means each having a plurality of photo-sensors for sensing a light pattern of an object having a parallax;
    normal processing means for calculating an in-focus error in accordance with output signals from said first and second pattern detection means without statistical processing;
    statistical processing means for sampling the output signals from said first and second pattern detection means a plurality of times, statistically processing the output signals and calculating an in-focus error in accordance with a result of the statistical processing; and
    selection means for selecting the in-focus error calculated by said normal processing means or the in-focus error calculated by said statistical processing means as focus adjustment information in accordance with the in-focus error calculated by said normal processing means.

11. A focus state detection apparatus according to claim 10, wherein said statistical processing includes time-averaging of the output signals for each photo-sensor.

12. A focus state detection apparatus comprising:
    first and second pattern detection means each having a plurality of photo-sensors for sensing a light pattern of an object having a parallax;
    normal processing means for calculating an in-focus error in accordance with output signals from said first and second pattern detection means without statistical processing;
    statistical processing means for sampling the output signals from said first and second pattern detection means a plurality of times, statistically processing the output signals and calculating an in-focus error in accordance with a result of the statistical processing;
    photo-sensing means for sensing the brightness of an object field of the object; and
    selection means for selecting the in-focus error calculated by said normal processing means or the in-focus error calculated by said statistical processing means as focus adjustment information in accordance with an output from said photo-sensing means.

13. A focus state detection apparatus according to claim 12, wherein the statistical processing includes time-averaging of the output signals for each photo-sensor.

* * * * *

UNITED STATES PATENT AND TRADEMARK OFFICE
CERTIFICATE OF CORRECTION

PATENT NO. : 4,716,282
DATED : December 29, 1987
INVENTOR(S) : AKIRA AKASHI, ET AL.

It is certified that error appears in the above-identified patent and that said Letters Patent is hereby corrected as shown below:

COLUMN 1

Line 37, "of" should read --if--.

COLUMN 2

Line 35, "relevent" should read --relevant--.

COLUMN 3

Line 12, "store signal CI" should read --store signal IC--.
    Line 14, "image" should read --images--.
    Line 31, "signal" should read --signals--.

COLUMN 4

Line 11, "is" should read --in--.
    Line 29, "is" (second occurrence) should read --in--.
    Line 30, "in" (first occurrence) should read --is--.
    Line 61, "or" should read --on--.

Signed and Sealed this

Fourteenth Day of February, 1989

*Attest:*

DONALD J. QUIGG

*Attesting Officer*    *Commissioner of Patents and Trademarks*